Figure 1:
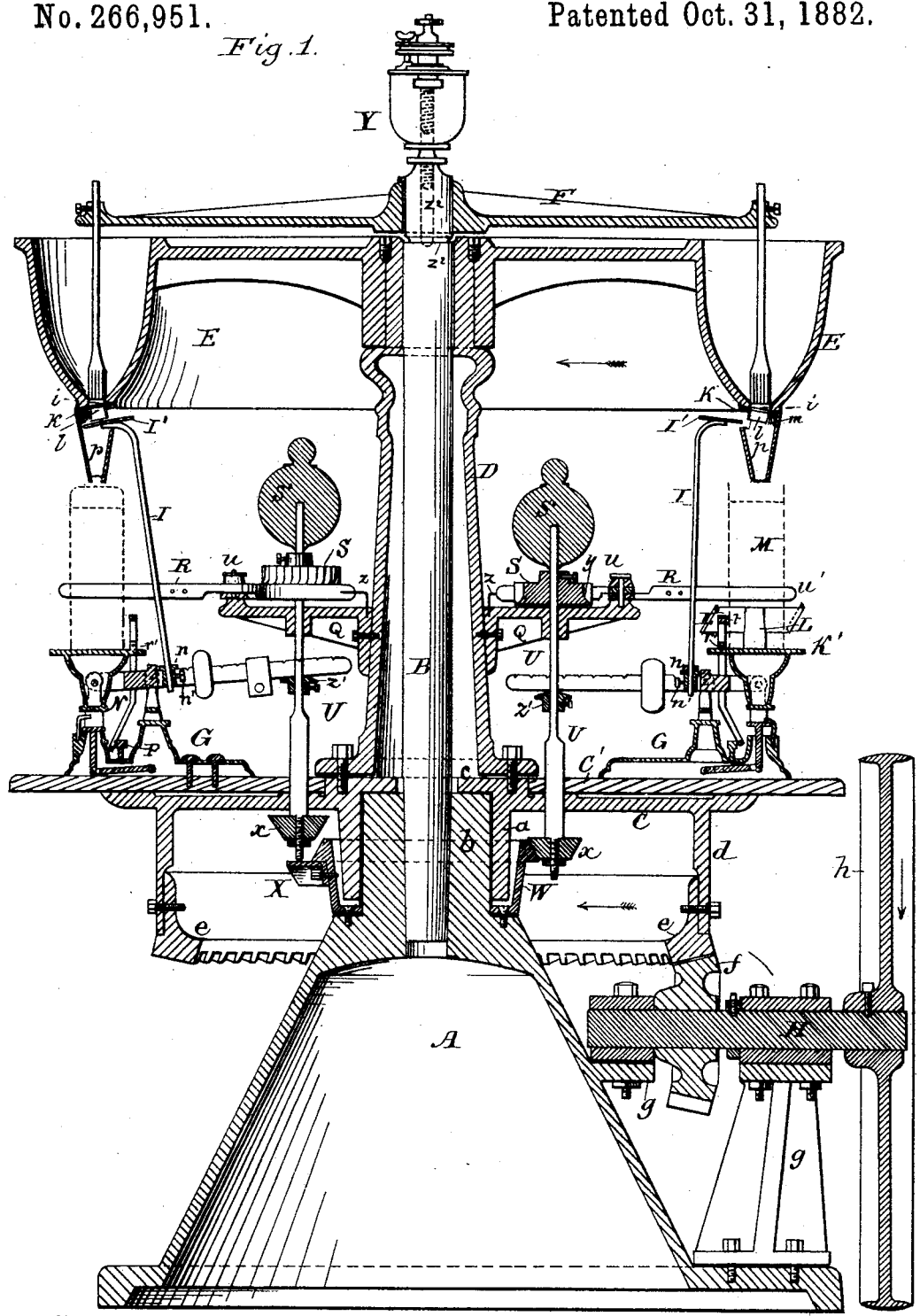

(No Model.) 2 Sheets—Sheet 1.

C. C. CLAWSON.
AUTOMATIC WEIGHING AND PACKAGE FILLING MACHINE.

No. 266,951. Patented Oct. 31, 1882.

Witnesses:
E. E. Masson
Philip Mauro

Inventor
Clement C. Clawson
by Chas. J. Hedrick
his attorney

N. PETERS, Photo-Lithographer, Washington, D. C.

(No Model.) 2 Sheets—Sheet 2.
C. C. CLAWSON.
AUTOMATIC WEIGHING AND PACKAGE FILLING MACHINE.
No. 266,951. Patented Oct. 31, 1882.
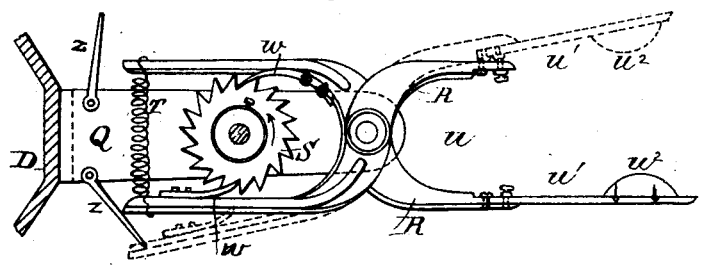
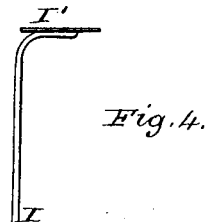
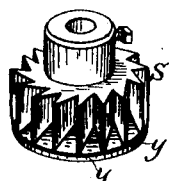
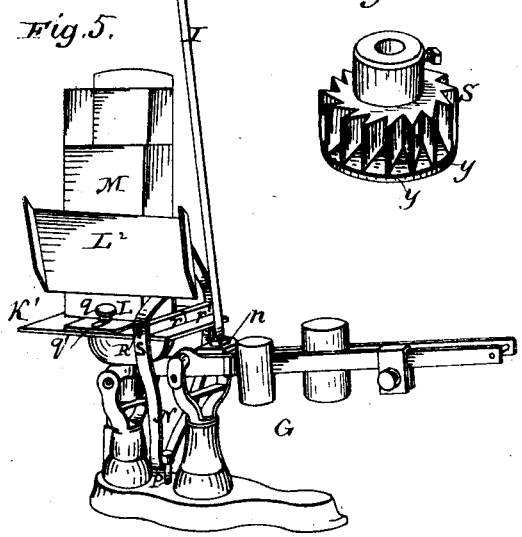
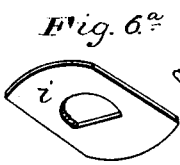
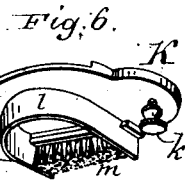
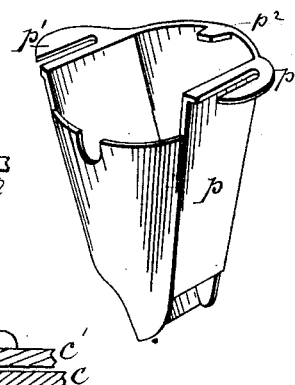
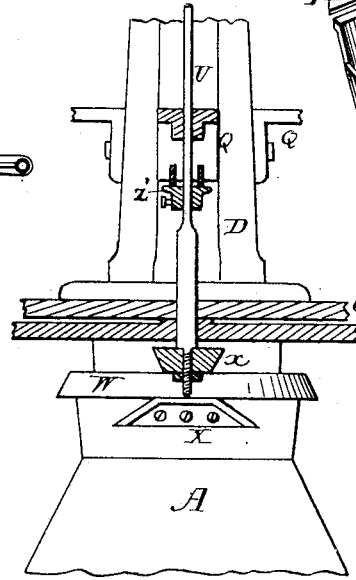
Witnesses:
E. E. Masson
Philip Mauro
Inventor:
Clement C. Clawson
by Chas. J. Hedrick
his attorney

UNITED STATES PATENT OFFICE.

CLEMENT C. CLAWSON, OF RALEIGH, NORTH CAROLINA, ASSIGNOR OF ONE-HALF TO H. K. & F. B. THURBER & CO., OF NEW YORK, N. Y.

AUTOMATIC WEIGHING AND PACKAGE-FILLING MACHINE.

SPECIFICATION forming part of Letters Patent No. 266,951, dated October 31, 1882.

Application filed August 30, 1882. (No model.)

*To all whom it may concern:*

Be it known that I, CLEMENT C. CLAWSON, a citizen of the United States of America, residing at Raleigh, in the county of Wake and State of North Carolina, have invented certain new and useful Improvements in Automatic Weighing and Package-Filling Apparatus, of which the following specification is a full description.

This invention has reference to an apparatus for automatically weighing granular or pulverulent materials of all kinds—such as spices, coffee, rice, hominy, sugar, tapioca, tobacco, and the like—and for filling packages with a definite weight of such material.

As an automatic weighing-scale, the apparatus is of that class in which a gate controlling the flow of material from a hopper is operated by the tilting of the scale-beam under the weight in the scale-pan or on the scale-plate.

The first part of the invention has for its object to reduce to a minimum the friction of parts which interferes with the delicacy of weighing operations. A gate sliding in guides or ways, as heretofore ordinarily employed, develops considerable friction, which demands proportionate power to overcome, and which, moreover, renders the gate liable to become stuck, and thus fail to operate. Besides the sliding gate, a gate suspended at the ends of depending links has also been employed; but this is open to the objection that the gate, in closing, is obliged slightly to lift or compress the material in the hopper. In the present invention the difficulty is overcome by supporting the gate on an upright lever-arm fulcrumed below instead of above. The upper surface of the gate is preferably also made to conform approximately or exactly to the arc in which it moves. The action is further improved by arranging the fulcrum some distance in the rear of the hopper's mouth instead of directly below it, so that the gate will be inclined downward toward the front, and thus will be less liable to carry back with it any of the material being weighed. In the present invention, also, friction between the operating device connected with the scale-beam and the gate or its support is obviated by fixing the lower end of the gate-supporting arm to the scale-beam, so that they form, as it were, one structure, movable about the fulcrum of the scale-beam as a common center. This new construction is, moreover, most compact and durable, and affords little opportunity for getting out of order. In the present invention the gate is made to work out of contact with, although in close proximity to, the walls of the hopper's mouth.

The second part of the invention has for its object to avoid interference with the weighing operation by grains of the material getting between the front of the gate and the opposite wall of the hopper. This difficulty is most likely to occur with large grains of a form not spherical—such as coffee, for example. The difficulty is overcome by placing a brush of bristles, wire, or other suitable material in which the grains may embed themselves opposite the front end of the gate. The other walls of the mouth may be, and preferably are, metallic. The gate does not make contact with the brush, although in close proximity thereto. It may be observed that heretofore bristles have been used around the mouth of the hopper in order to make with the gate a close joint, attended with little friction, and that this construction is not covered by the present invention.

The third part of the invention has for its object to adapt the same apparatus for use with a variety of substances by enabling the opening through which the material is delivered to be altered in size as desired. Different materials require for the best operation to be delivered through openings of different size. Coffee, for example, requires a larger-sized opening than rice. A bushing removably secured in the mouth of the hopper is preferably employed to enable the change to be made. This bushing is provided with an opening of the proper size for the article being weighed, and can be removed and replaced by a bushing having a different-sized opening when a change is desired. It is obvious that a slide above the gate of the weighing-scale could be used for the same purpose.

The fourth part of the invention consists in the arrangement of a small spout below the gate, the better to guide the material into packages, said spout being attached to the hopper and forming a housing for the gate when closed.

The fifth part of the invention has for its object to provide devices for keeping the supply-gate closed after a full package is removed until a fresh cartoon or package is placed in position, and for then permitting the supply-gate to be opened automatically. A latch operated by the cartoon or package is employed for the purpose. This latch is held out of engagement with its catch so long as the package is on the scale pan or plate; but when the scale-pan is depressed and the package is removed it automatically engages the catch. The replacement of the package releases the latch, and, if the package is empty, the scale-weight raises it and the scale-pan and opens the supply-gate.

The sixth part of the invention comprises certain attachments to the scale-pan for supporting the cartoon or package and for causing any overflow to be delivered upon the table supporting the scales, instead of upon the floor. They will be explained in detail hereinafter.

The seventh part of the invention comprises means for tapping the cartoon or package, so as to shake down the material delivered thereinto. The particular devices adopted for the purpose will be hereinafter explained.

The eighth part of the invention consists in combining a number of automatic weighing-scales and a supply-hopper with means for insuring at certain intervals the positive closing of the supply-gate should the weighed material be insufficient to close it, as may sometimes be the case by reason of foreign matters in the material, or from other cause.

It further consists in providing means for automatically throwing the tapping devices out of action to permit the removal and replacement of the cartoon or package.

It also comprises particular constructions, combinations, and arrangements of parts, as hereinafter specified.

Having explained the general nature and principle of the invention, what is deemed the best mode of applying the same will now be described, reference being had to the accompanying drawings, which form a part of this specification.

Figure 1 is a central vertical section of the machine or complete apparatus; Fig. 2, a plan of the tapping devices; Fig. 3, a perspective of ratchet-wheel; Figs. 4 and 5, perspectives of a weighing-scale with attachments; Fig. 6, perspective view of mouth-piece; Fig. 6ª, perspective view of the bushing at the hopper's mouth; Fig. 7, perspective view of small spout; Fig. 8, plan of stirrer-frame, and Fig. 9 detail view of stationary cam.

A is the base of the machine-frame, or, as hereinafter called, the "pedestal;" B, an upright stationary shaft, having its lower end tapered and set (and keyed, if desired) in a socket in the pedestal; C, a rotary table, supported by and turning upon the top of the pedestal; D, a hollow column, bolted at the foot to the revolving table, and at the upper end fitting around the upright stationary shaft, which forms a journal therefor; E, an annular U-shaped hopper, fixed to and supported by the hollow column; F, a spider-frame, attached to the stationary shaft, and provided at the outer end of each arm with a stirrer that projects into the annular hopper and has a brush at its lower end; and G, a series of weighing-scales.

The table C has a hub, a, that surrounds the cylindrical head b of the pedestal A, and an internal flange, c, that rests upon the top of said head. Near the circumference of the table is an annular depending flange, d, to which the annular bevel-gear e is bolted. Motion is imparted to the table in the direction of the arrow through the bevel-gear f and the horizontal shaft H, that is journaled in bearings in the brackets g and is driven by a belt running on the pulley h. The table C is faced with a marble slab, C', so as to give it a smooth surface that may easily be kept clean. Upon the table are placed the weighing-scales G—say four in number, although there may be less or more. In the bottom of the hopper there are as many openings as there are scales on the table. The scales are alike, and the description of one will suffice for all. The scale-pan, the beam, and the scale-frame are of any ordinary or suitable construction.

Attached to the scale-beam, just back of the fulcrum, is the vertical arm I, to the upper end of which is fastened the gate I', that controls the delivery of the material from the hopper. Being attached to and carried by the scale-beam, the said arm I has the same fulcrum as the scale-beam. This fulcrum being in the rear of the hopper's mouth instead of directly under it, the arm I inclosing the gate falls forward out of the perpendicular. Under each of the openings in the bottom of the hopper is a mouth-piece, K. Between this mouth-piece and the bottom of the hopper is formed a recess for the removable bushing i, (see Fig. 6ª,) which is provided with a hole of the size adapted to the material being weighed. By loosening the screws k, that secure the mouth-piece to the hopper, the bushing can be taken out of its recess and a new one placed in its stead. The openings in the bushing and the mouth-piece are preferably segments equal in area to about two-thirds of a circle; but they may be circular or of other shape. A depending lip or flange, l, of metal, surrounds the opening, except at the front, (the straight side of the segmental opening,) where its place is taken by the brush m, which is removably held in position, its end fitting in recesses in the lip or flange l. The said lip or flange and the brush form the walls of the hopper's mouth. Their lower edges lie in a plane inclined to the horizontal to the same degree as the supply-gate I' when closed. This supply-gate works out of contact with, but in close proximity to, the said edges.

The arm I is preferably made adjustable, so that the proper relation of the gate to the hopper's mouth may readily be secured. As shown, the end of the arm fits in a socket-piece, n, attached to the scale-beam, and is held in place by a set-screw, n', by loosening which the arm may be moved up or down. The adjustment may be secured in other ways. For example, the arm could be screw-threaded and provided with jam-nuts above and below the socket, or it could be tapped directly into the socket; or, instead of making it adjustable in its socket, the arm could be made of two or more parts, connected by a coupling, which permits the elongation or contraction of the said arm, as required. Owing to the considerable length of the arm I and the small angle through which it moves, the path of the gate I' is approximately a straight line, and a flat plate may without inconvenience be used for the gate; but, if desired, a plate with the upper surface curved to conform exactly to the arc in which it moves may be employed. A small spout, p, is preferably secured under the mouth-piece. As shown, the spout has slotted ears p', that are slipped behind the heads of the screws k. It also has a small internal projection, $p^2$, that bears against the brush m and retains it in its recesses. The spout p is contracted toward the delivery end. At the bottom one side is cut away, so that the material will be delivered toward that side. The reason for this lies in the shape of the ordinary cartoons or packages, and will be hereinafter explained. This side delivery may not always be desirable, and the shape of the spout may be altered as required. The spout is of advantage in collecting the material after it has passed the gate, and also in furnishing a housing to the gate I' and hopper-mouth l m.

Upon the scale pan or plate K' the gage-plates L L' are fastened by thumb-screws q, tapped into the scale pan or plate and passing through slots in the foot-flanges q' of the gage-plates, so as to permit the latter to be adjusted nearer to or farther from each other. Thus the exact space required to receive the cartoon or package M may be left between the said plates. A stop, r, prevents the cartoon or package being pushed too far back. The gage-plate L is provided on its outside with a chute, $L^2$, inclined inward toward the center of the table. Its object is to deliver any overflow clear of the scale and well back on the table.

The latch N is pivoted at s to the cross-bar r', that is bolted or riveted to the scale-pan. At its lower end the said latch is adapted to engage the fixed catch P, formed by a long-headed screw tapped into the scale-frame, and at its upper end is provided with a contact-piece, t, to be struck by the cartoon or package when inserted, so as to press back the upper end of the latch and hold the lower end away from the fixed catch. At each scale are tapping devices, as follows:

To each of the brackets Q two tapping-arms, R, are pivoted, as indicated at u, where the said arms cross like the blades of shears. Their front ends are adapted to receive the cartoon or package between them. Preferably the said ends u' are made separate from the body of the tapping-arms and are bolted thereto, and preferably, also, they are provided with pads $u^2$ for striking the sides of the cartoons or packages. They are or may be made of thin steel plates, so as to be slightly flexible or elastic. The rear ends embrace between them the ratchet-wheel S, and have each a tappet, w, that engages the teeth of said wheel. A spiral tension-spring, T, connects and tends to draw together the ends of the tapping-arms. By turning the wheel S the inclined faces of the teeth act against the tappets w and spread apart the tapping-arms. The teeth then escape from under the tappets, and the spring T, exerting its power, draws together the tapping-arms, which give a light quick blow simultaneously upon opposite sides of the cartoon or package. Each ratchet-wheel S (there being one for each scale) is fixed on an upright rotary spindle, U, journaled in one of the brackets Q and in the rotary table C. At the lower end of said spindle U is a bevel friction-pinion, x, that travels over the friction-gear W, that is bolted to the pedestal A. The spindle U and pinion x being carried around with the table C, and the apparatus supported thereby, and the wheel W being stationary, it is obvious that the said spindle, with the ratchet-wheel S, will be revolved by the friction between the said pinion and gear. The wheel S, as shown, is not a plain ratchet, but has at the bottom of the space between every two teeth an inclined plane, y. By lifting the said wheel S these planes will act upon the tappets w and spread apart the tapping-arms, holding them in that position till it is again dropped down. The spindle U is made capable of a longitudinal movement in its bearings. A stationary cam, X, (shown bolted to the friction-gear W,) is placed in the path of the lower end of said spindle, so that when it reaches and is carried over said cam it will ride up the inclined surface and raise the ratchet-wheel S, spreading apart the tapping-arms. This lifting of the spindle U also disengages the pinion x, so that the rotation of the wheel S ceases. After passing the cam the spindle U and wheel S are allowed to descend, the pinion x again engages the friction-gear W, and the rotation of the wheel S and the vibration of the tapping-arms again commence. A weight, S', on the upper end of the spindle U aids in holding it down. By the operation, therefore, of the cam X, the tapping apparatus is, at each rotation of the table C, automatically thrown out of action for a certain interval, and then automatically caused to resume. The purpose of this is to give opportunity for the attendant's removing a full package and placing an empty one in its stead. Sometimes the tapping is not necessary, and then the arms are held apart by the wire fingers z, pivoted to the bracket Q, so that the revolution of the wheel S has no effect upon the said arms.

The lifting of the spindle U by the cam X is also utilized to insure the positive closing of the gate at each revolution of the table. For this purpose a device, $z'$, is secured by a set-screw on each spindle U, just below the scale-beam. The device is of such size as to extend under the beam. In the normal working of the machine the two are not in contact; but if for any reason the scale-pan should not be depressed when the cam X is reached, the spindle U being then lifted, the device $z'$ strikes the beam, raises it, and closes the gate I'.

Upon the top of the upright shaft B is an automatic oiler, Y, of any known or suitable construction. Formed in the shaft are oil-passages $z^2$, that deliver the oil between the shaft and the bearing of the column D. The oil then flows down the shaft B inside the hollow column, lubricates the bearings of the table C, and is finally caught in the drip-cup formed by the gear W.

The operation of the machine or apparatus is as follows: The scales being all latched down, so that all the gates I' are closed, and the proper bushings, $i$, being placed and secured in the recesses therefor, and the gage-plates L L' being adjusted the proper distance apart for the packages to be filled, and the scale-weights being adjusted on the beam, the hopper E is filled to the proper depth—say one-third—with the material to be weighed and packed, and the machine is started. The table C being revolved, the scales are successively made to pass the attendant, who is stationed in front of the cam X. As they come opposite him he places a cartoon or empty package, M, between the gage-plates L L' until stopped by the stop $r$. He is careful to place the side of the cartoon which has no flap adjacent to the gage-plate L, that is provided with the chute $L^2$. This makes the opposite side, which has the longest flap, face the mouth of the spout $p$. This mouth has been made at one side, in order to deliver the material away from the open or flapless side. The cartoon or package, as it is inserted, strikes and pushes back the contact-piece $t$, vibrating the latch N and releasing it from the fixed catch P. The scale pan, with its cartoon or package, does not, however, rise immediately, because the spindle U is still raised by the cam X, and the device $z'$ upholds the scale-beam, keeping the gate I' closed. As the spindle U is gradually allowed to descend the gate I' opens and allows the material to descend through the spout $p$ into the cartoon or package. The descent of the spindle U brings the pinion $x$ into contact with the friction-gear W, and the said spindle and the ratchet-wheel S commence to revolve.

If the tapping devices are not held apart by the fingers $z$, the arms R are vibrated by the wheel S and spring T and tap on the sides of the cartoon, so as to shake down the material delivered thereinto. The taps, being light and taking place simultaneously on opposite sides of the cartoon or package, interfere little or not at all with the weighing operation. As soon as the proper quantity of material has passed into the cartoon or package the scale-pan is depressed, tilting forward the arm I and gate I' and stopping the delivery of material. The weight of the said arm and gate being thrown out of the perpendicular aids in closing the gate. As the latter has only to work against the material, it encounters but little resistance and is easily closed. Should a grain be caught between the gate and the front wall of the hopper's mouth, said wall, being formed of the brush $m$, yields, and does not prevent the closing. After the delivery ceases the tapping continues until the spindle U is again raised by the cam X, when the full package is removed and a fresh one put in its place. As soon as the full package is removed, the latch N immediately drops into engagement with the catch P, and if the attendant should neglect to insert an empty cartoon the said catch would continue to hold down the scale and keep closed the gate until the latch is released by the insertion of a fresh cartoon or package. Should the attendant not remove a full package, its weight would of course keep the gate I' closed.

Sometimes it may happen that the gate will not close under the action of the weight of the material on the scale. In such case the cam X, as it lifts the spindle U, raises the scale-beam and closes the gate. It will be seen, therefore, that the closing of the gate once in a revolution of the table is insured irrespective of the condition of the material in the scale-pan. Should there be an overflow of material from the cartoon, the chute $L^2$ delivers it clear of the scale back upon the marble top C' of the table C. The annular hopper E being carried around with the table C, and the stirrer-frame F being attached to the stationary shaft B, it is obvious that the stirrers agitate and keep level the material in the hopper, and that the openings in the hopper will be swept by the brushes on the ends of the stirrers as they pass under said brushes. Access for cleaning the hopper may be had between the arms of the stirrer-frame F; or the shaft B could be prolonged, so as to allow the said frame to be lifted.

Modifications may be made in the details of construction without departing from the spirit of my invention, and portions of the invention may be used separately. For example, a very useful small machine can be made by combining the weighing-scale and hopper with their appendages. In such case the hopper would not be annular, but square or other ordinary form in plan or horizontal section. The mechanical tapping devices, driven by a suitably-formed shaft, could be combined with such a machine, or they could be omitted; and so, also, a cam for insuring the closing of the gate at definite intervals or for throwing the tapping devices out of action.

The enlarged machine shown could be modified by making the table and hopper stationary and the stirrer-frame, cam, and cupped friction-gear rotary; but in this case the advantage of having a series of scales passing in succession a given point, so that an attendant could look after them all without changing his position, would be lost.

Instead of using an automatic latch adapted to be released by contact with the inserted cartoon or package, a latch that would engage itself whenever the scale-pan is depressed could be employed, the said latch being disengaged by hand.

The scale-pan adapted to receive a cartoon or package and hold it in an upright position could be used in connection with an automatic gate-closing mechanism of any ordinary or suitable construction, instead of the improved mechanism described.

The removable bushing or its equivalent for enabling the delivery-opening in the hopper to be enlarged or diminished, as required, could be used with other measuring apparatus than one which measures by weight—to wit, with that which measures the charge by bulk. The annular hopper could be made V-shaped or of other suitable form, instead of that shown. So also many other changes could be made and the invention in whole or in part still be employed.

I claim the new improvements herein described, all and several, to wit:

1. The upright lever-arm fulcrumed at its lower end, and the gate supported and operated by said arm, in combination with a hopper and weighing-scale, substantially as described.

2. The combination, with a hopper, of the gate and the upright lever-arm carrying said gate, and having the fulcrum at its lower end and to the rear of the hopper's mouth, substantially as described.

3. The combination, with a hopper, of the gate carried by a lever-arm having its fulcrum at the bottom and adjusted to work out of contact with, but in close proximity to, the walls of the hopper's mouth, substantially as described.

4. The combination, with a hopper and a gate carried by an upright lever-arm fulcrumed at the bottom, of means, as explained, for adjusting the position of the gate with respect to the hopper's mouth, substantially as described.

5. The combination, with a hopper, of a gate carried by a lever-arm, and having its upper surface convex to conform to the arc in which it moves, substantially as described.

6. The combination, with a hopper and a weighing-scale, of the lever-arm fixed to and carried by the scale-beam, and the supply-controlling gate supported and operated by said arm, substantially as described.

7. The combination of the hopper, weighing-scale, lever-arm supported and operated by the scale-beam, gate supported and operated by the lever-arm, and the adjusting means, substantially as described.

8. The combination, with a hopper and weighing-scale, of the gate and the upright supporting-arm carrying the gate, fulcrumed at its lower end, and arranged to fall forward out of the perpendicular when the scale is overbalanced, substantially as described.

9. The combination, with a hopper and an automatic apparatus for measuring the material delivered from said hopper, of means, as described, independent of said apparatus for regulating the size of the opening in the bottom of the hopper, substantially as described.

10. The combination, with the hopper, weighing-scale, and gate, of the removable bushing or its equivalent, as specified, placed between the said gate and the body of the hopper, substantially as described.

11. The hopper having its mouth formed on one side by a brush and on the others by a metallic lip or flange, and combined with a gate adapted to operate as described.

12. The combination, with the hopper and gate, of the brush removably secured at the front of the hopper's mouth, substantially as described.

13. The combination, with a hopper having the front wall of its mouth formed of yielding material—such as the bristles of a brush—of a gate carried by a lever-arm fulcrumed at the bottom and adjusted to work out of contact, but in close proximity to the walls of said mouth, substantially as described.

14. The combination of the hopper, the weighing-scale, the gate controlled by said scale, and the stationary spout attached to the hopper below the gate, and forming a housing for the latter when closed, substantially as described.

15. The combination, with an automatic weighing-scale, of a latch for holding the scale-pan depressed with the supply-gate closed, substantially as described.

16. The combination, with an automatic weighing-scale, of the latch for keeping the supply-gate closed, adapted automatically to be released by the insertion of a cartoon or package, substantially as described.

17. The combination, with the scale pan or plate, of the adjustable gage-plates, substantially as described.

18. The scale pan or plate provided with the gage-plates and stop, substantially as described.

19. In a package-filling apparatus, the combination, with a weighing-scale, of a chute for delivering any overflow clear of the scale, substantially as described.

20. The weighing-scale, gage-plates, and stop, in combination with the latch provided with a contact-piece, substantially as described.

21. The combination of the hopper, weighing-scale, lever-arm, gate, gage-plates, and latch, substantially as described.

22. The combination, with weighing and package-filling apparatus, of mechanical tapping devices for shaking down the material in the cartoons or packages, substantially as described.

23. The combination, with a weighing-scale, of mechanical devices for tapping the cartoon or package on said scale, substantially as described.

24. The combination, with the tapping-arms adapted to receive a cartoon or package between their front ends, of mechanism for vibrating said arms, so that they strike the cartoon or package at the same time on opposite sides, substantially as described.

25. The combination of the horizontal tapping-arms, ratchet-wheel, and spring, substantially as described.

26. The tapping-arms having the front or operating ends formed of flexible bars detachably secured to the body of the arms, substantially as described.

27. The combination, with the weighing and filling apparatus and the tapping devices, of means for throwing or keeping the latter out of action, substantially as described.

28. The combination, with a rotary supporting-table and rotary hopper, of a series of automatic weighing-scales, each having a gate controlled and operated directly by the weight in the scale-pan, substantially as described.

29. The combination of the rotary supporting-table, rotary hopper, and series of automatic weighing-scales having each its scale-pan or scale-plate adapted to receive a cartoon or package, substantially as described.

30. An automatic weighing-scale having a scale pan or plate provided with side plates for supporting in an upright position a cartoon or package, substantially as described.

31. The automatic weighing-scale having a supply-gate, of which the movement in both directions is controlled by said scale, and provided with a scale-pan adapted to receive and support upright a cartoon or package, substantially as described.

32. The combination, with an automatic weighing-scale having a gate controlling the delivery from a hopper, of an automatic mechanism—such as a cam—and connections for insuring the closing of the aforesaid gate at intervals irrespective of the condition of the scale, substantially as described.

33. The combination, with a package-filling apparatus and tapping devices, of automatic mechanism—such as the cam—and connections for throwing said devices out of action, substantially as described.

34. The combination, with the rotary table and hopper, automatic weighing-scales, and tapping devices, of a stationary gear for operating said devices, and a stationary cam for throwing the same out of action, substantially as described.

35. The combination, with the tapping-arms, of the operating-wheel carried by a longitudinally-movable spindle, and having ratchet-teeth for vibrating said arms, and surfaces inclined to the vertical for spreading and holding apart the arms, substantially as described.

36. The combination of the pedestal, the table supported by and revolving upon said pedestal, the upright stationary shaft, the stirrer-frame carried by said shaft, the upright column carried by the table, and the hopper carried by the column, substantially as described.

37. The combination of the pedestal, the revolving table, the upright shaft provided with oil-passages, the oiler on top of said shaft, and a drip-cup surrounding the base of said shaft and the hub of said table, substantially as described.

38. The herein-described weighing and package-filling apparatus, comprising the following elements in combination, to wit: the table, the weighing-scales supported thereon, the hopper, the attachments to the scales, including the latch and supply-gates, the tapping devices, the gearing for operating the same, and the cam and its connections, all substantially as and for the purpose set forth.

In testimony whereof I affix my signature in presence of two witnesses.

CLEMENT C. CLAWSON.

Witnesses:
GEORGE T. LEACH,
ALEX. WILEY.